(12) United States Patent
Pol et al.

(10) Patent No.: US 11,757,097 B2
(45) Date of Patent: Sep. 12, 2023

(54) METHODS FOR PRODUCING FUNCTIONALIZED CARBON NANOSHEETS AND ELECTROCHEMICAL ENERGY STORAGE CELLS WITH ELECTRODES FORMED THEREOF

(71) Applicant: Purdue Research Foundation, West Lafayette, IN (US)

(72) Inventors: Vilas Ganpat Pol, West Lafayette, IN (US); Vinodkumar Etacheri, Madrid (ES)

(73) Assignee: Purdue Research Foundation, West Lafayette, IN (US)

(*) Notice: Subject to any disclaimer, the term of this patent is extended or adjusted under 35 U.S.C. 154(b) by 181 days.

(21) Appl. No.: 17/145,644

(22) Filed: Jan. 11, 2021

(65) Prior Publication Data
US 2021/0218026 A1    Jul. 15, 2021

Related U.S. Application Data

(60) Provisional application No. 62/958,776, filed on Jan. 9, 2020.

(51) Int. Cl.
*H01M 4/587* (2010.01)
*H01M 10/054* (2010.01)
(Continued)

(52) U.S. Cl.
CPC .............. *H01M 4/587* (2013.01); *C01B 32/15* (2017.08); *H01M 10/054* (2013.01);
(Continued)

(58) Field of Classification Search
CPC combination set(s) only.
See application file for complete search history.

(56) References Cited

U.S. PATENT DOCUMENTS

2017/0170459 A1* 6/2017 Pol .................. B22F 1/054

FOREIGN PATENT DOCUMENTS

CN    105502386 A  *  4/2016

OTHER PUBLICATIONS

Etacheri, et al., Cobalt Nanoparticles Chemically Bonded to Porous Carbon Nanosheets: A Stable High-Capacity Anode for Fast-Charging Lithium-Ion Batteries, Jan. 2018, Appl. Mater. Inter, 10, 4652-4661 (Year: 2018).*

(Continued)

*Primary Examiner* — Daniel S Gatewood
(74) *Attorney, Agent, or Firm* — Hartman Global IP Law; Gary M. Hartman; Domenica N. S. Hartman

(57) ABSTRACT

Methods of producing functionalized carbon nanosheets capable of use as electrode materials in electrochemical energy storage cells, electrodes and electrode materials formed thereby, and electrochemical energy storage cells of sodium-ion batteries that utilize such electrodes and electrode materials. Such a method of producing functionalized carbon nanosheets includes preparing a solution containing dissolved glucose, mixing a quantity of NaCl crystals with the solution to form a mixture, drying the mixture to form a gel comprising NaCl crystals each having a layer of glucose thereon, heating the gel in an inert atmosphere to a processing temperature and for a duration sufficient to cause carbonization of the glucose and in situ functionalization with oxygen-containing functional groups, and removing the NaCl crystals to yield the functionalized carbon nanosheets.

14 Claims, 12 Drawing Sheets

(51) Int. Cl.
 *C01B 32/15* (2017.01)
 *H01M 4/02* (2006.01)
(52) U.S. Cl.
 CPC ...... *C01P 2002/02* (2013.01); *C01P 2004/24* (2013.01); *C01P 2006/16* (2013.01); *C01P 2006/40* (2013.01); *H01M 2004/021* (2013.01)

(56) References Cited

OTHER PUBLICATIONS

CN-105502386-A translation (Year: 2016).*

* cited by examiner

| Composition | Na (%) | Cl (%) | C (%) | O (%) |
|---|---|---|---|---|
| FCNS-800 | 0 | 0 | 94.24 | 5.76 |
| FCNS-800 after discharge | 8.96 | 0.32 | 60.90 | 29.81 |
| FCNS-800 after charge | 0.30 | 0.12 | 70.89 | 28.68 |

METHODS FOR PRODUCING FUNCTIONALIZED CARBON NANOSHEETS AND ELECTROCHEMICAL ENERGY STORAGE CELLS WITH ELECTRODES FORMED THEREOF

CROSS-REFERENCE TO RELATED APPLICATIONS

This application claims the benefit of U.S. Provisional Application No. 62/958,776 filed Jan. 9, 2020, the contents of which are incorporated herein by reference.

BACKGROUND OF THE INVENTION

The present invention generally relates to electrochemical energy storage cells and to electrodes and electrode materials therefor. The invention particularly relates to methods of producing functionalized carbon nanosheets, particularly for use as electrode materials in sodium (Na)-ion batteries.

Rechargeable batteries are widely used in various applications, including but not limited to portable electronic devices, electric grids, medical devices, and electric vehicles. Though lithium ion (Li-ion) batteries are one of the most developed energy storage technologies, their energy and power densities are not sufficient to satisfy the desired requirements of certain applications, as a nonlimiting example, electric vehicles. Expense, limited supply and irregular geographic distribution of lithium are additional factors hindering the future development of Li-ion batteries. Hence, it is desirable to develop higher-performing battery technologies that are based on more abundant and less costly materials.

Sodium ion (Na-ion) batteries have attracted interest as an alternative to Li-ion batteries due to the abundance and inexpensive nature of sodium. The electrochemical reduction-oxidation (redox) potential of sodium (−2.71V vs. standard hydrogen electrode (SHE)) is only 0.3 V higher than that of lithium, making it a promising candidate for energy storage devices. However, rate performance and long-term cycling stabilities of current generation Na-ion batteries have not yet proven adequate for practical applications. This is mainly due to the larger ionic radius of Na ions (1.02 Å) compared to Li ions (0.76 Å) that result in sluggish shuttling of solvated Na ions and slow diffusion into individual electrodes. Graphite anodes used in Li-ion batteries are not suitable for Na-ion batteries due to their narrow interlayer spacing (0.344 nm) and a specific capacity of only 35 mAh/g can be obtained on sodiation. Consequently, further development of high capacity anode materials is desired for the development of next-generation Na-ion batteries.

A variety of anode materials, including carbonaceous materials, oxides, organic compounds and alloying materials, have been widely studied as potential anode materials for Na-ion batteries. However, huge volume changes, loss of electric contact and active material agglomeration of alloying/conversion type anodes have caused rapid capacity fading in these materials. Specific capacities of insertion-type oxide anodes are low for practical applications. Low electronic and ionic conductivities of transition metal oxides and organic compounds also cause poor rate performance and cycling stabilities.

Despite the development of several types of high capacity Na-ion battery anode materials, carbonaceous materials have been the most attractive candidates due to their high electronic conductivity and reasonable specific capacity and cycling stabilities. Hard carbon is the most studied carbonaceous Na-ion battery anode to date due to its low average voltage and high reversible capacity. Carbon derived from polymeric sources such as phenolic resin and resorcinol formaldehyde resin has especially attracted interest due to their spherical particle morphology, disordered structure and large interlayer spacing. Synthesis of hard carbon from various precursors such as banana peels, sucrose, peat moss, silk, lignin, etc., has been investigated. The effect of various factors such as heteroatom contents, structural differences and morphologies on the Na-ion storage performance have also been demonstrated. Although several carbonaceous materials have been explored as electrode materials, specific capacities at higher charge-discharge rates and cycling stabilities are still lacking. Hence, further progress, including progress in the scalable synthesis of carbonaceous electrodes, is required to sufficiently improve the Na-ion storage performance of carbonaceous electrode materials for the commercialization of rechargeable Na-ion batteries.

One of the most widely used methods to improve the electrochemical performance of metal oxide and carbon-based electrode materials is the fabrication of nanostructures such as nanosheets, nanotubes, and nanospheres. Another recently demonstrated strategy is pseudocapacitive charge storage on transition metal oxide and sulfide electrodes. An advantage of the pseudocapacitive charge storage mechanism is its diffusion independent nature, which allows for a faster charge-discharge process and long cycle life due to a minimum change of electrode crystal structure. However, specific capacities of intrinsically pseudocapacitive metal oxides are far from realizing practical Na-ion batteries. Additionally, there has been little effort on the pseudocapacitive Na-ion storage on carbonaceous electrodes.

In view of the above, it can be appreciated that it would be desirable if improved electrode materials were available for use in Na-ion batteries that were capable of at least partly overcoming or avoiding the problems, shortcomings or disadvantages noted above.

BRIEF DESCRIPTION OF THE INVENTION

The present invention provides methods suitable for producing functionalized carbon nanosheets which may be used as electrode materials in electrochemical energy storage cells of Na-ion batteries, as well as provides electrodes and electrode materials formed thereby and electrochemical energy storage cells of Na-ion batteries that utilize such electrodes and electrode materials.

According to one aspect of the invention, a method of producing functionalized carbon nanosheets includes preparing a solution containing dissolved glucose, mixing a quantity of NaCl crystals with the solution to form a mixture, drying the mixture to form a gel comprising NaCl crystals each having a layer of glucose thereon, heating the gel in an inert atmosphere to a processing temperature and for a duration sufficient to cause carbonization of the glucose and in situ functionalization with oxygen-containing functional groups, and removing the NaCl crystals to yield the functionalized carbon nanosheets.

Other aspects of the invention include electrodes formed from the functionalized carbon nanosheets and electrochemical energy storage cells having such electrodes.

Technical effects of a method and a functionalized carbon nanosheet as described above preferably include the capability of producing electrodes capable of improving the performance and storage capacity of Na-ion batteries.

Other aspects and advantages of this invention will be appreciated from the following detailed description.

DETAILED DESCRIPTION OF THE INVENTION

Figures 8, 9:
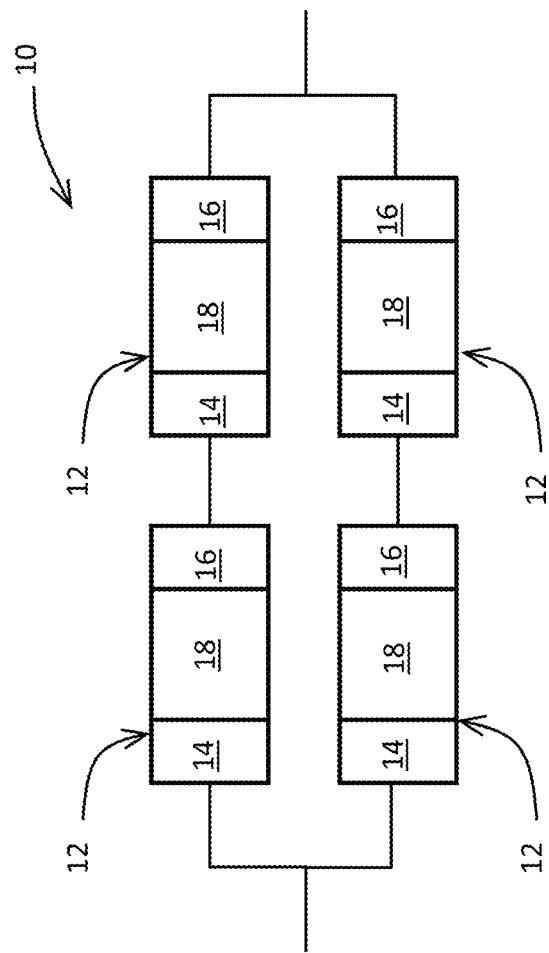
FIG. 8 includes a table representing atomic percentages of Na, Cl, C and O on FCNS-800 electrodes under different state of charge (calculated using high-resolution XPS spectra).
FIG. 9 schematically represents a battery comprising a plurality of electrochemical cells that are electrically connected in series and in parallel.

Disclosed herein are methods for producing functionalized carbon nanosheets and electrode materials formed from the functionalized carbon nanosheets. Anodes formed from the electrode materials are suitable for use in electrochemical energy storage cells, such as those used in a Na-ion battery. FIG. 9 schematically represents such a battery 10 as comprising multiple storage cell 12 each comprising an anode (negative electrode) 14 separated from a cathode (positive electrode) 16 by an electrolyte 18, all of which are within an insulating housing with suitable terminals (not shown) being provided in electronic contact with the anode 14 and cathode 16. Binders and other materials suitable for use in the electrolyte 18, anode 14, and cathode 16 are well known in the art and therefore are not described herein. FIG. 9 represents the battery 10 as comprising two series of multiple electrochemical cells 12, with the series arranged in parallel. Though representative of a battery capable of utilizing electrode materials disclosed herein, it should be understood that the particular configuration shown in FIG. 9 is not to be interpreted as limiting on the scope of the invention.

Figure 1:
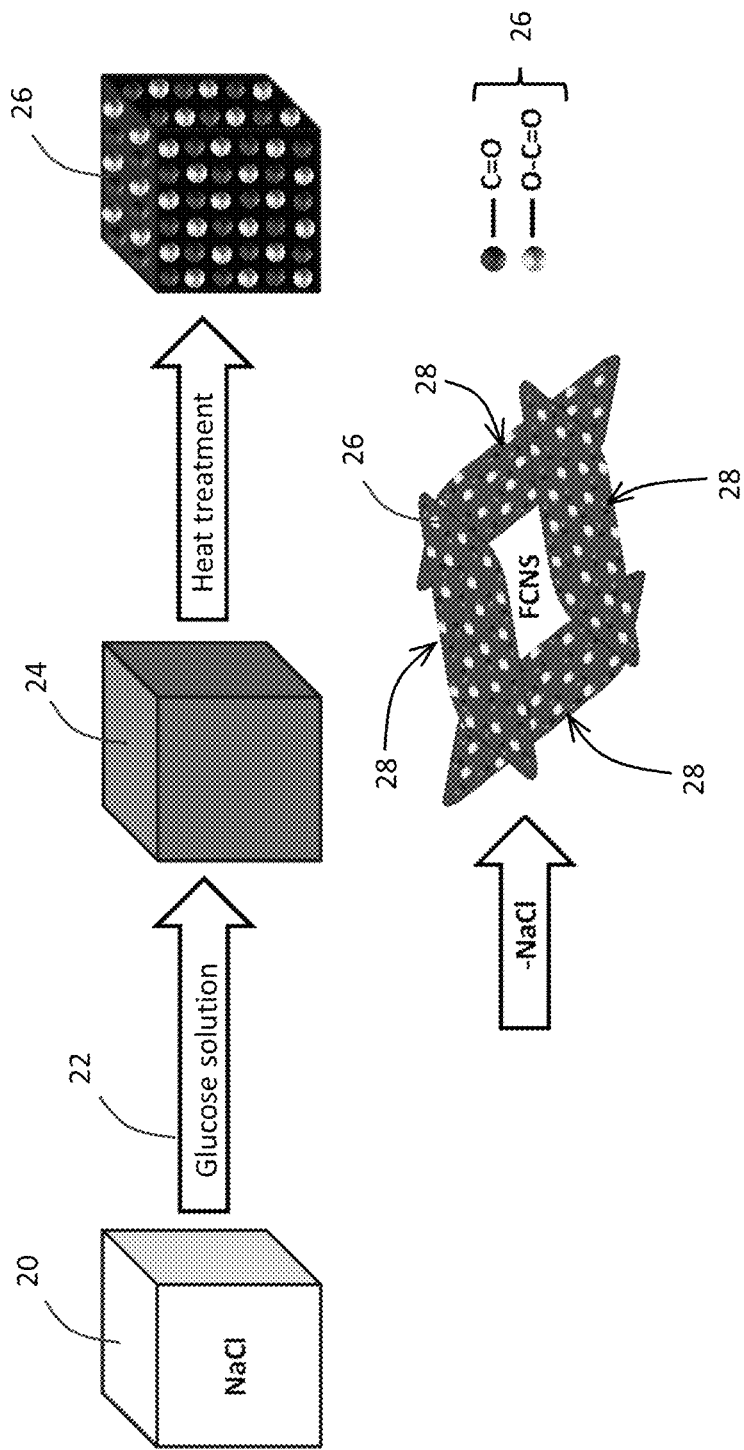
FIG. 1 schematically represents a method of synthesizing in situ functionalized ultrathin carbon nanosheets (FCNS).

According to nonlimiting embodiments, electrode materials can be in situ functionalized carbon nanosheets (FCNS) that are ultrathin and synthesized through a NaCl templated method, as schematically represented in FIG. 1. As represented, the method involves sodium chloride (NaCl) crystals with a cubic morphology that are used as templates 20. The templates 20 are combined with a saturated solution 22 formed by dissolving glucose ($C_6H_{12}O_6$) in deionized water ($H_2O$). The resulting mixture is then dried, resulting in a gel comprising the crystalline NaCl templates 20 each having a thin glucose layer 24 thereon. The gel is then heat treated in an inert atmosphere to cause carbonization of the glucose layer 24 and in situ functionalization with oxygen-containing functional groups 26 (identified as O—C=O and C=O groups) on the surfaces of the NaCl templates 20. The NaCl templates 20 are then removed to cause the collapse of the remaining carbonized layers and result in individual functionalized carbon nanosheets (FCNS) 28 whose surfaces are functionalized with the oxygen-containing functional groups 26 (also referred to herein as surface functional groups).

Nonlimiting embodiments of the invention will now be described in reference to experimental investigations leading up to the invention.

For the nonlimiting investigations described below, functionalized carbon nanosheets were synthesized by completely dissolving 1 g of glucose ($C_6H_{12}O_6$) in a minimal amount of deionized water. This saturated solution was then mixed with 15 g of sodium chloride (NaCl) (NaCl to glucose ratio of 15:1 by weight) followed by drying in an air oven at 100° C. for 12 hours. The obtained gel was then heat treated at 500, 600, 700, and 800° C. for two hours under Ar-gas flow (heating and cooling rates were 10° C./minute), yielding a black powder that was thoroughly washed with deionized water to remove NaCl followed by drying in a vacuum oven at 80° C. for 24 hours to form ultrathin (about 15 nm) in situ functionalized carbon nanosheets with surface functional groups. In the discussion below, the functionalized carbon nanosheets are identified by their heat treatment temperatures of 500, 600, 700, and 800° C. as, respectively, FCNS-500, FCNS-600, FCNS-700, and FCNS-800. For comparing the electrochemical performance, functionalized carbon nanosheets with different thicknesses were prepared by varying the glucose:NaCl ratio. Carbon nanosheets (CNS) without surface functional groups were prepared by heat-treating functionalized carbon nanosheets under Ar—$H_2$ gas flow at 800° C. for two hours. Amorphous carbon particles were also synthesized for comparison without using NaCl templates.

Figures 2A, 2B:
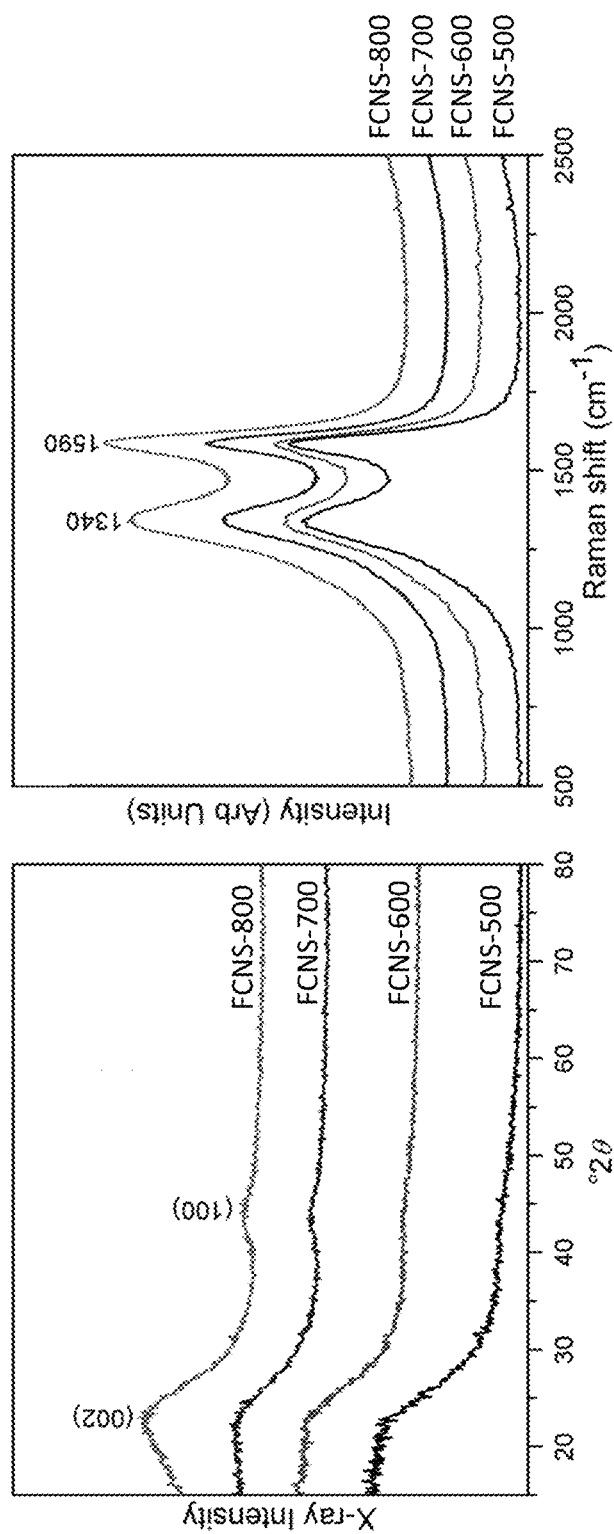
FIGS. 2A and 2B include X-ray diffraction patterns and Raman spectra, respectively, of in situ functionalized ultrathin carbon nanosheets prepared at different temperatures.

X-ray diffraction (XRD) patterns of the functionalized carbon nanosheet samples prepared at the different temperatures are presented in FIG. 2A. Distinctive peaks at 23° and 43° are characteristic of (002) and (100) graphitic planes. A low degree of graphitization in these carbon nanosheets is identified by the broad diffraction peaks. The d-spacing of functionalized ultrathin carbon nanosheets prepared at 800° C. (FCNS-800) calculated from the (002) XRD peak was 0.42 nm, which is larger than the interlayer spacing of graphite (0.344 nm). Increased orderness at the higher calcinations temperature of 800° C. was evidenced by the higher intensities of the (002) and (100) peaks. The disordered nature of the carbon nanosheets, which is beneficial for improved Na-ion diffusion, was further evidenced by the Raman spectra (FIG. 2B). Distinctive D and G peaks correspond to $A_{1g}$ symmetry of carbon/structural defects and $E_{2g}$ mode of the graphitic layers 1340 and 1590 cm$^{-1}$ respectively. The relative intensities of D and G bands (ID/IG) were 0.973, for the low temperature processed sample FCNS-500 (FCNS prepared at 500° C.), and 0.915 for the high temperature sample FCNS-800. Lowering of the D/G ratio and full width at half maximum (FWHM) of Raman peaks with an increase in processing temperature indicated the formation of a more ordered structure. The disordered carbon microstructure is attractive for Na-ion battery anode application due to the increased d-spacing that facilitates Na-ion intercalation, an additional defect-induced Na-ion storage mechanism. Phase purity of the carbon nanosheets and complete removal of the NaCl templates is also evident from the XRD and Raman patterns.

Figure 3B:
FIGS. 3A through 3F include SEM (FIGS. 3A-3C) and TEM images (FIGS. 3D and 3E) at different magnifications, and an AFM image (FIG. 3F) of in situ functionalized ultrathin carbon nanosheets prepared at 800° C. (FCNS-800).
Figure 3D:
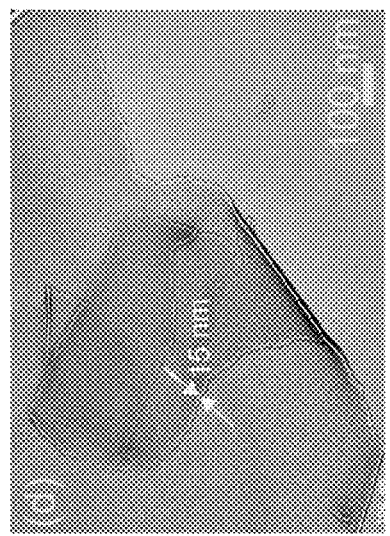
Figure 3F:
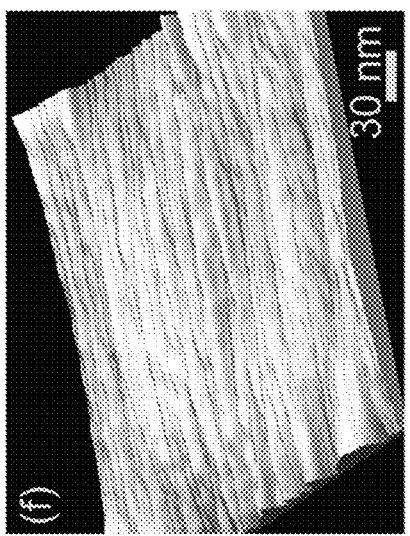
Figure 3A:
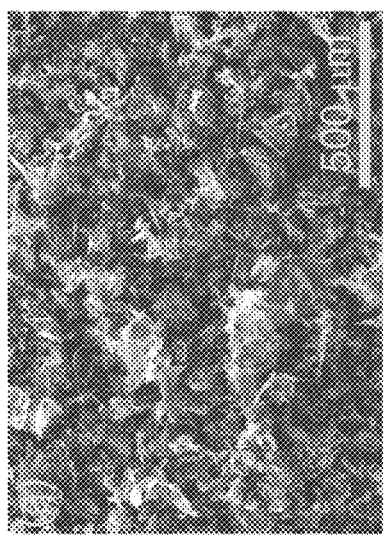
Figure 3C:
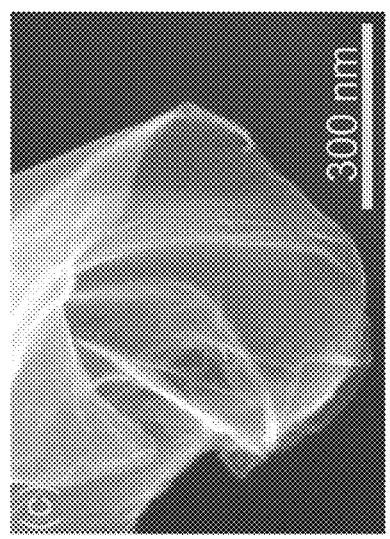
Figure 3E:
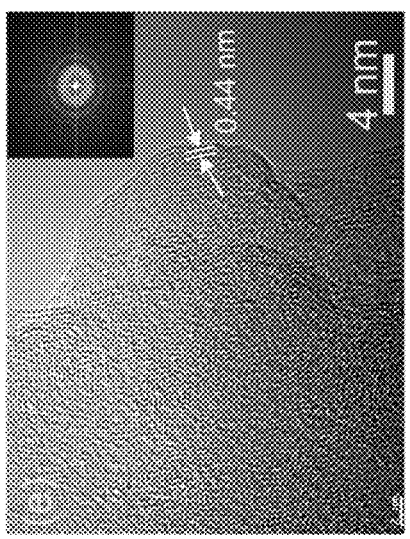

Scanning electronmicroscopy (SEM) images of functionalized carbon nanosheets at different magnifications (FIGS. 3A through 3C) confirmed the formation of carbon nanosheets with lengths of about 20-30 μm, thicknesses of about 15±2 nm, and a low degree of agglomeration. EDX spectra of the electrochemically most active nanosheet samples (FCNS-800) displayed about 6% of oxygen, and a uniform surface distribution was clear from EDX mapping images. Absence of Cl and Na in the EDX pattern also confirmed the phase purity of nanosheets and complete removal of the NaCl templates. Presence of oxygen on FCNS samples can be related to the formation of oxygen-containing functional groups formed during the carbonization of glucose. The role of NaCl crystals in the carbon nanosheets formation was further evidenced by the formation of carbon particles in the absence of NaCl. Further microstructural characterizations of FCNS samples were carried out using transmission electron microscopy (TEM) and atomic force microscopy (AFM). TEM images at different magnifications (FIGS. 3D and 3E) confirmed their 2D morphology and a disordered nature that was in good agreement with SEM, XRD and Raman results. Selected area electron diffraction (SAED) pattern of FCNS-800 (FIG. 3E inset) can be indexed to (002) and (100) planes of disordered carbon. The interlayer spacing of 0.44 nm measured from the HRTEM image (FIG. 3E) is larger than the interlayer spacing of graphite (0.344 nm) and also in good agreement with the values calculated from XRD spectra. It was thus clear that the in situ functionalized carbon nanosheets had a disordered structure and larger interlayer spacing than graphite, which is advantageous for Na ion insertion. Atomic force microscopy (AFM) studies were performed to investigate the 2D morphology and surface roughness of the FCNS samples. Contact mode AFM image of the FCNS-800 sample (FIG. 3F) confirmed a thickness of 15±2 nm that was in line with the thickness identified from HRSEM and HRTEM images. Additional findings from the AFM analysis included the ultra-smooth nature of the functionalized carbon nanosheets, which is beneficial for homogeneous current density distribution, uniform SEI formation, and a consequent cycling stability.

Figure 4A:
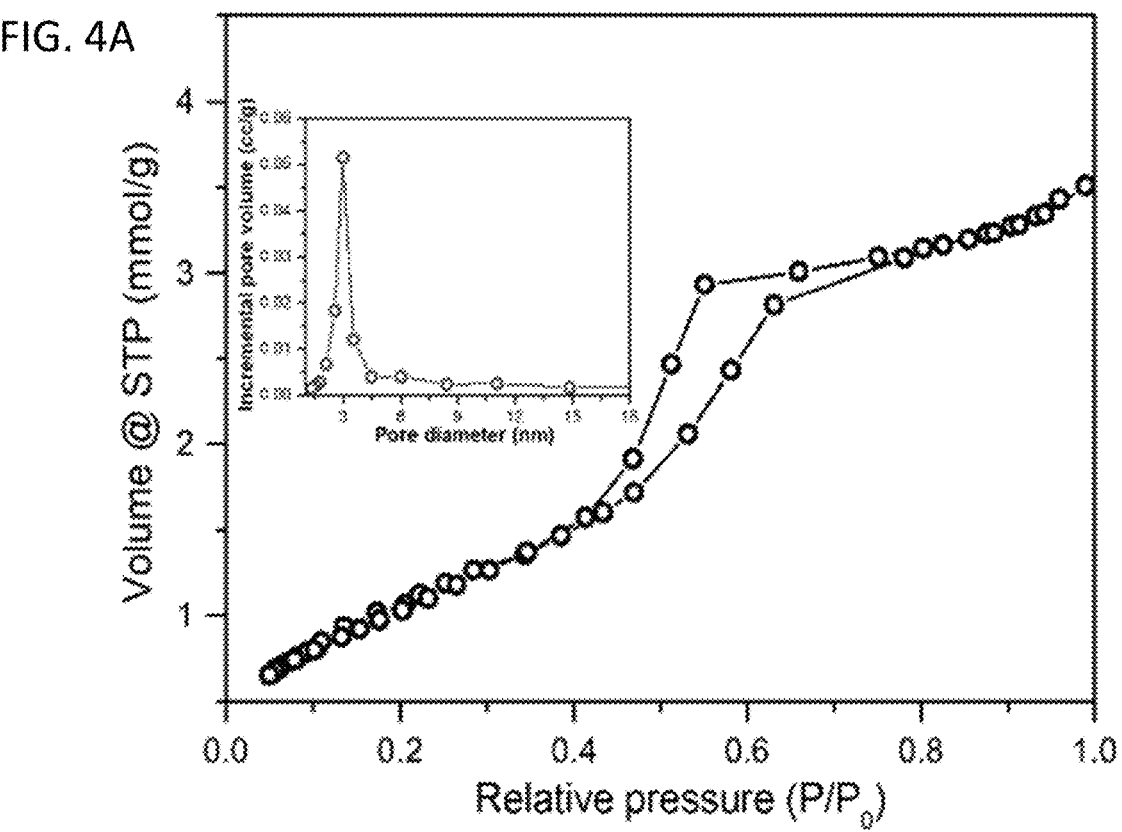
FIGS. 4A and 4B include $N_2$-adsorption desorption isotherm (FIG. 4A) and pore size distribution (FIG. 4A inset) of an FCNS-800 sample, and thermogravimetric analysis (FIG. 4B, line (i)) and differential thermal analysis (FIG. 4B, line (ii)) of the FCNS precursor (glucose-coated NaCl) at a heating rate of 10° C./min.

X-ray photoelectron spectra (XPS) of carbon nanosheets were systematically investigated to gain further insight into their surface chemical state. C is high resolution spectra of the FCNS-800 sample were deconvoluted into peaks corresponding to C—C (284.8 eV), C—O (285.5 eV) and C=O/O—C=O (289.8 eV) groups. High resolution O is spectra were separated into individual signals at 532.8, and 534.3 eV corresponding to C=O, and O—C=O groups. Surface quantitative analysis using high-resolution O is spectra demonstrated that FCNS-800 contains about 5.76% oxygen-containing functional groups, which is in good agreement with the EDX quantification data. It is worth noting that no additional chemicals were used for nanosheet functionalization, and oxygen-containing groups were resulting from the thermal decomposition of glucose. Further textural property investigations of the functionalized carbon nanosheets were performed using an $N_2$-adsorption-desorption study. An isotherm of a sample of the most electrochemically active composition (FCNS-800) is presented in FIG. 4A. This sample displayed type-IV characteristic with $H_3$-type hysteresis, and a Brunauer-Emmett-Teller (BET) specific surface area of 128 m$^2$/g. Barret-Joyner-Halenda (BJH) analysis (FIG. 4A inset) confirmed the mesopores nature of the carbon nanosheets. The presence of micropores in this sample was also evidenced by the increased steepness of the isotherm in the low-pressure region (P/P0=0.04 to 0.2). A second $N_2$ adsorption at high relative pressure (P/P0=0.4-1.0), and a hysteresis loop clearly indicated the existence of mesopores (for example, pore diameters between 2 and 50 nm). Large amounts of mesopores (about 3 nm) in FCNS-800 are beneficial for achieving superior electrode-electrolyte contact, and possibly serve as a reservoir for extra Na ion storage. These observations signified the formation of high surface area porous carbon nanosheets through a controlled carbonization of a glucose layer on a crystalline NaCl template.

Figure 4B:
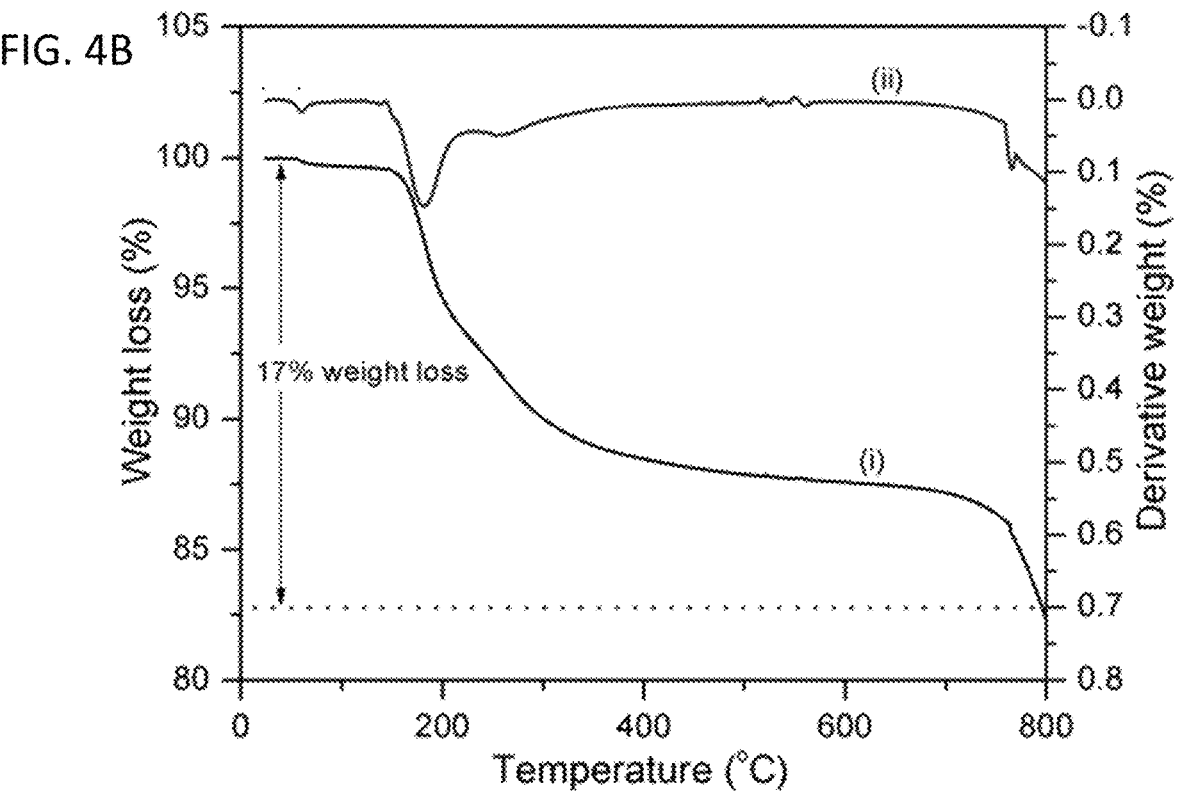

TGA analysis of the glucose-NaCl mixture was performed under an Ar-atmosphere (FIG. 4B). On heating the mixture, an initial weight loss occurred around 60° C. due to adsorbed water removal from the glucose. Second and major weight losses occurred in a wide temperature range of about 150 to 400° C. with sharp signals at 180 and 250° C. This was attributed to the thermal decomposition of the glucose into carbon nanosheets containing the surface functional groups. Final weight loss occurred between 700 and 800° C. due to the removal of impurities such as $CO_2$, $H_2$, CO etc., and probably due to the evaporation of salt. In total the precursor experienced an approximately 17% weight loss during its conversion to the functionalized carbon nanosheets. Thus, it was concluded that the deposition of glucose on the NaCl crystal templates followed by carbonization and template removal resulted in the formation of ultrathin in situ functionalized carbon nanosheets. The method was inexpensive and scalable and can be easily extended to anion/cation doped carbon nanosheets and their hybrids with metal/metal oxides by using appropriate water soluble precursors.

Figure 5A:
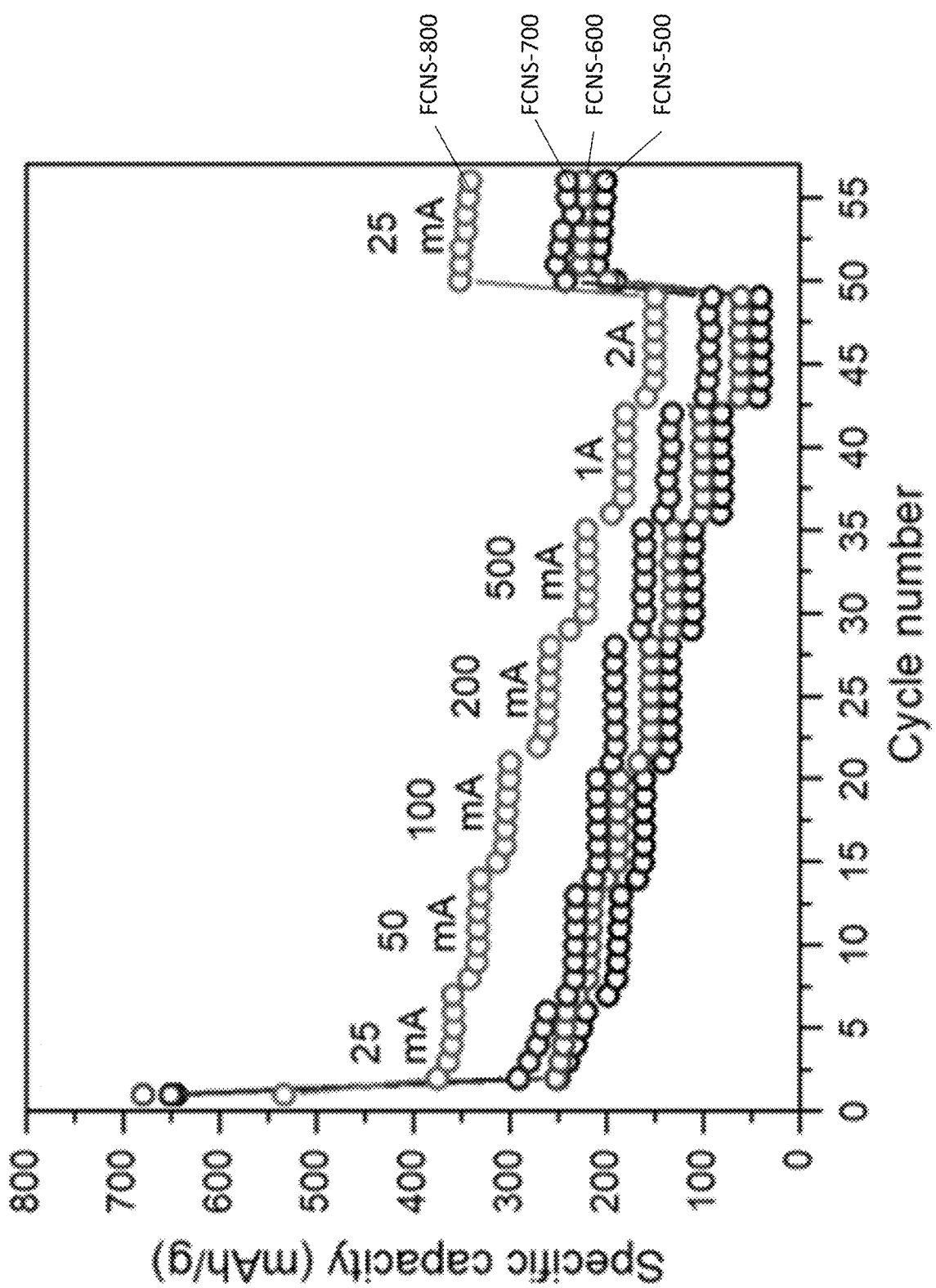
FIGS. 5A through 5F include galvanostatic rate performance (FIG. 5A) and corresponding voltage (FIG. 5B) profiles of an FCNS-800 electrode at different current densities, cyclic voltammograms of the FCNS-800 electrode at a scan rate of 0.1 mV/s (FIG. 5C), cyclic voltammograms of the FCNS-800 electrode at different scan rates (FIG. 5D), scan rate dependence of peak current of the FCNS-800 electrode (FIG. 5E), and b-values of the FCNS-800 electrode at different states of charge in a Na-ion half-cell configuration (FIG. 5F).

The ultrathin in situ functionalized carbon nanosheets produced as described above demonstrated excellent Na-ion storage performance under different electrochemical test conditions. In order to investigate the electrochemical performance, electrodes composed of the functionalized carbon nanosheets prepared at different temperatures were subjected to galvanostatic charge-discharge measurements at different current densities in the voltage range 0 to 3 V (FIG. 5A). It was clear that FCNS-800 showed the best specific capacities and rate performances. Low performance of the low temperature processed FCNs samples can be related to their further disorderness that also hinders Na-ion intercalation. FCNS-800 exhibited a specific capacity of 375 mAh/g at a low current density of 25 mA/g. Specific capacities of 180 and 150 mAh/g are retained even at higher current densities of 1 A/g and 2A/g respectively. These values are considerably better than the theoretical capacity of current generation hard carbon anodes that can be practically achieved only at low charge discharge rates. As expected, the first galvanostatic cycle in the voltage range of 0 to 3V was associated with an irreversible capacity loss of 29.5% due to the formation of a solid electrolyte interface (SEI). Coulombic efficiency increased to about 100% in subsequent cycles indicating highly reversible Na-ion storage on the FCNS-800 sample. Further first-cycle coulombic efficiency enhancement for commercial full-cell fabrication can be achieved by the use of special electrolyte additives or stabilized Na-metal particles.

Figure 5B:
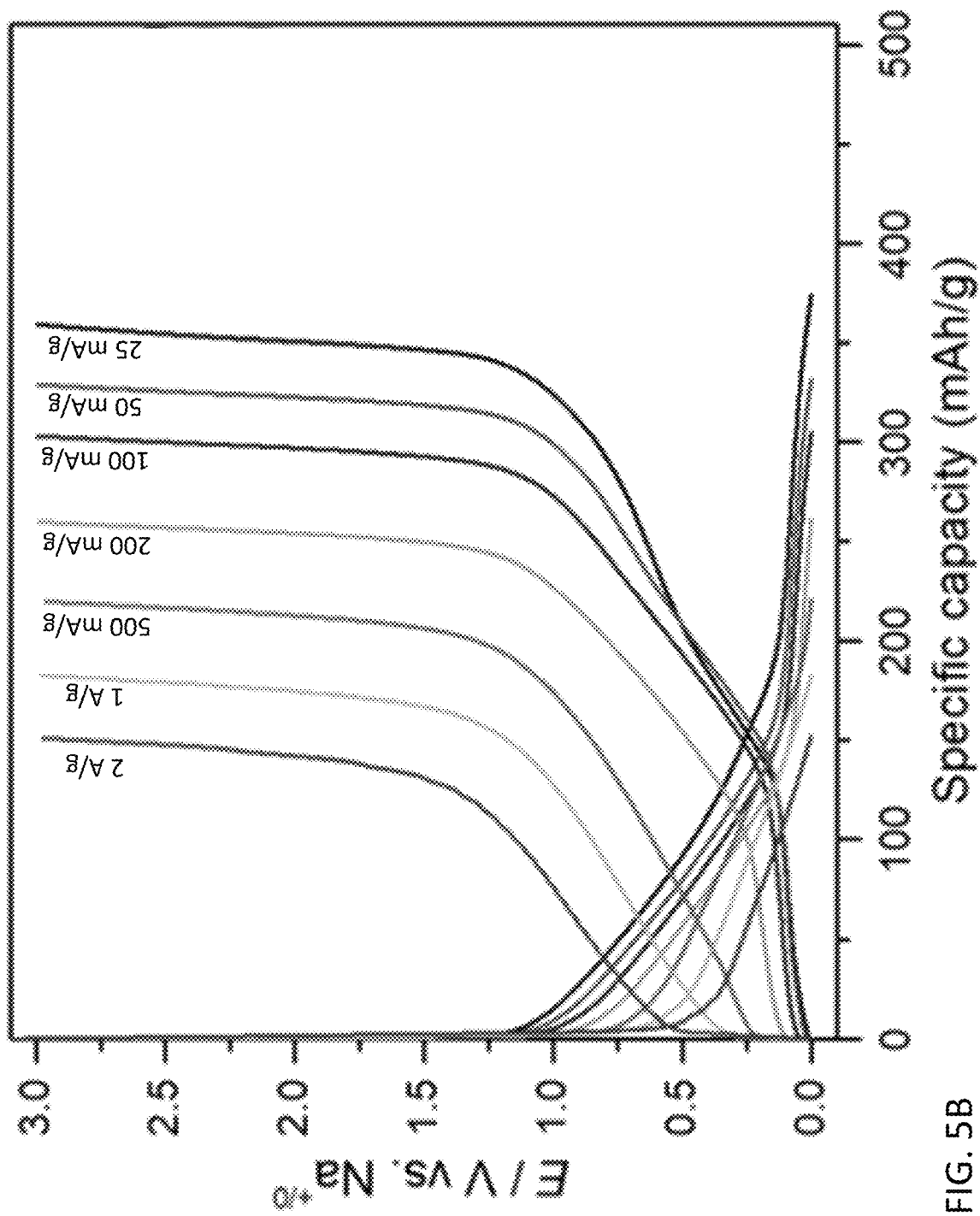

Galvanostatic voltage profiles of FCNS-800 at different current densities are presented in FIG. 5B. Sloping regions in the 1.2 to 0.15 V range represent Na-ion storage in pores, defects and oxygen-containing functional groups. A voltage plateau around 0.07 V was characteristic of Na-ion intercalation into the disordered graphitic layers of amorphous carbon. The voltage profiles varied considerably with current densities, and the plateau corresponding to Na-ion intercalation became shorter at higher current densities. Only the sloping region of the voltage profile contributes to the specific capacity at current densities of 1 and 2 A/g. This is a clear indication of different Na-ion storage mechanisms at different charge-discharge rates. Both surface and bulk Na-ion storage contribute to the total specific capacity at slow charge-discharge rates. Only surface Na-ion storage occurs at higher charge-discharge rates due to the sluggish Na-ion diffusion into the disordered graphitic layers. It is worth noting that voltage profile changes of FCNS-800 at different current densities were considerably different from those previously reported for amorphous and hard carbon anodes. Charge profiles of FCNS-800 also confirmed complete desodation at 1.5 V, which is also favorable for its use as an anode material.

Figure 5C:
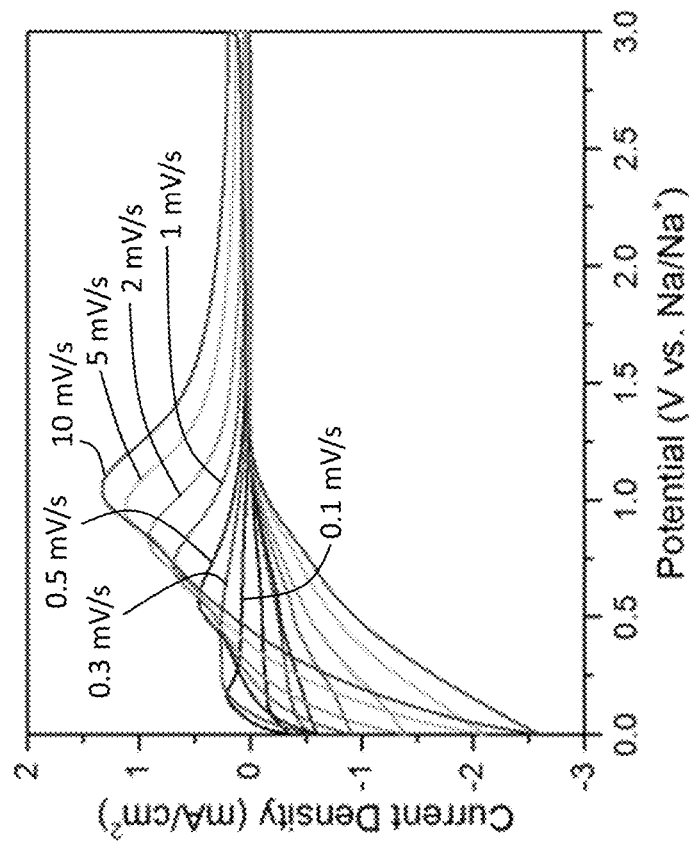

Cyclic voltammetry (CV) of FCNS-800 (FIG. 5C) provided additional details into the electrochemical process. A first cathodic signal in the potential range of 1 to 0.25 V was characteristic of the solid interface (SEI) formation and surface Na-ion storage due to the electrolyte reaction with defects and functional groups. This voltammetric response correlated well with the first cycle irreversible capacity loss and sloping voltage profile. Intensity of this peak decreased during the second cathodic scan suggesting complete SEI formation in the first cycle. A second cathodic signal in the voltage range of 0.20 to 0V corresponded to the Na-ion intercalation into the disordered graphitic layers of FCNS-800. These cathodic responses correlated well with the sloping area and plateau of the galvanostatic voltage profiles (FIG. 5B). A sharp anodic peak at 0.25 V and broad signal extending to 1.25 V corresponded to the desodiation of the FCNS-800 electrode. It is worth noting that desodiation was complete at 1.25 V and only negligible charge capacity was observed in the 1.25 to 3.0 V range. Such low voltage desodiation is a key requirement of Na-ion battery anodes for achieving high voltage full-cells.

Figure 5D:
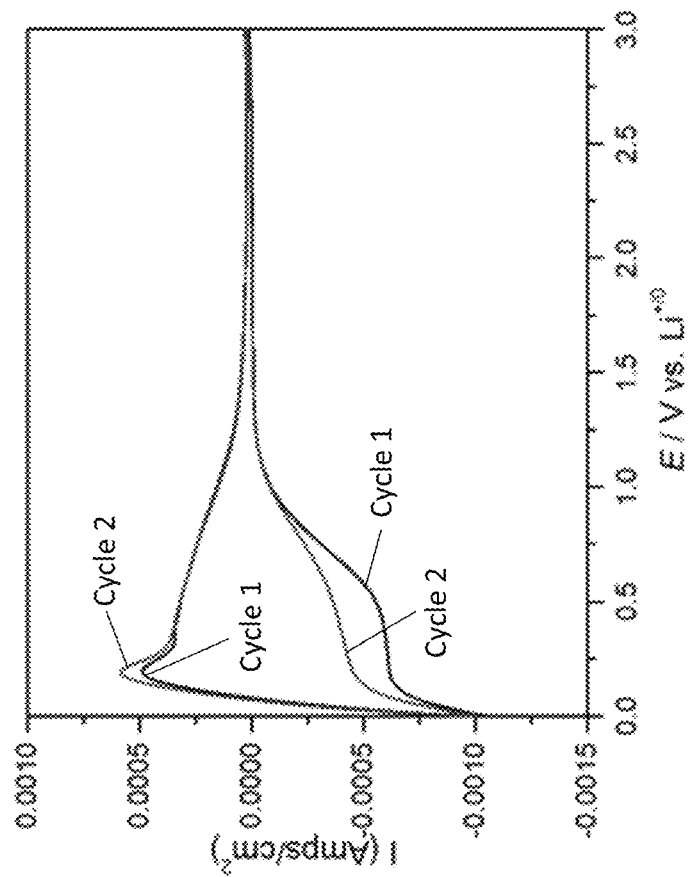

Cyclic voltammetry (CV) of FCNS-800 at different scan rates was performed (FIG. 5D) to obtain further insight into the Na-ion storage mechanism. Peak currents at different scan rates displayed a linear dependence (FIG. 5E) that is characteristic of pseudocapacitive type Na-ion storage. However, slightly lower $R^2$ values ($R^2=1$ for a completely pseudocapacitive process) of cathodic and anodic current dependence plot designated the process as not completely pseudocapacitive. Capacitive and faradaic type of charge storage can be represented by equation 3. Where "a" and "b" are adjustable parameters, "I" is the total current, and "v" is the scan rate.

$$I=av^b \quad (3)$$

Figure 5F:
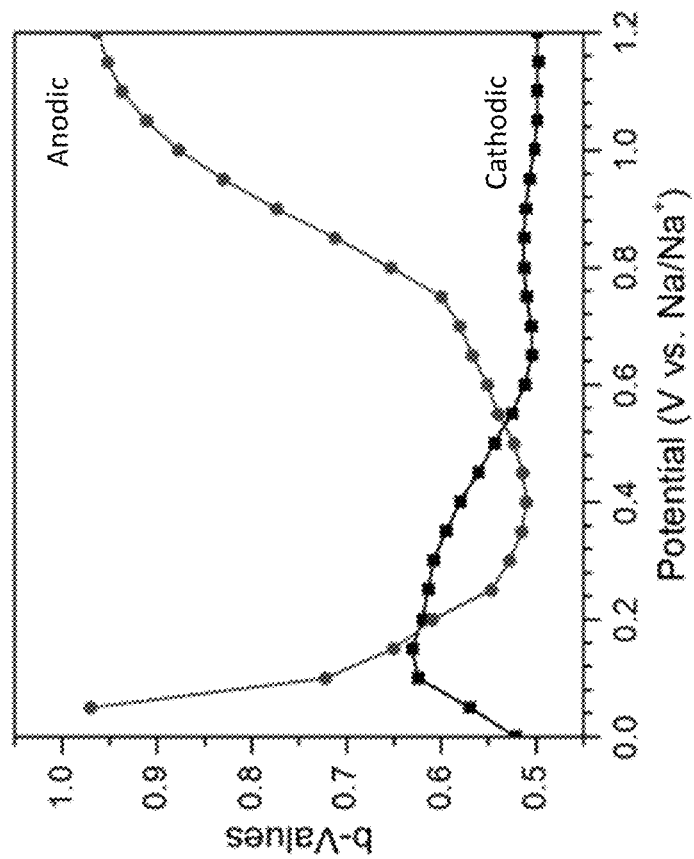
Figure 5E:
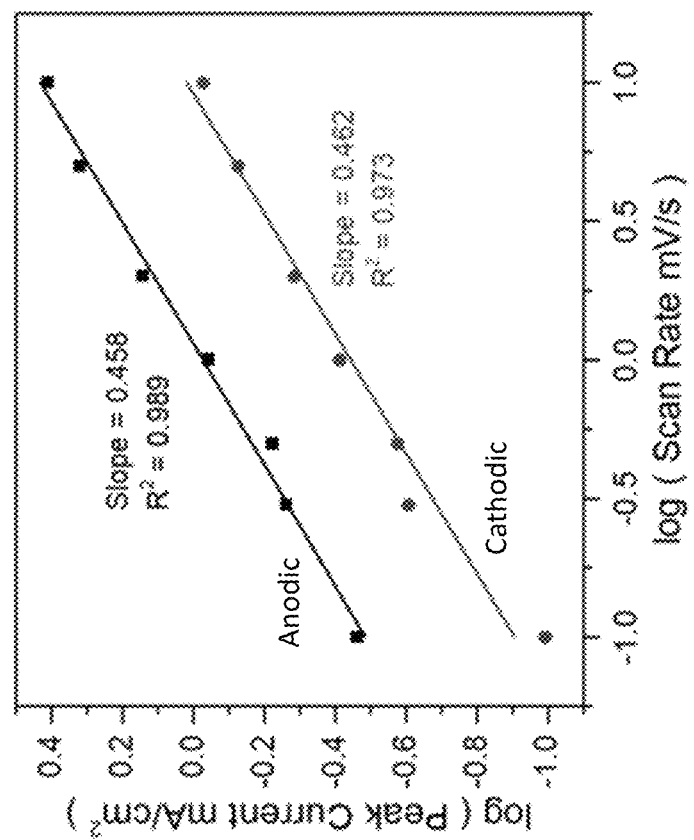
Figure 6B:
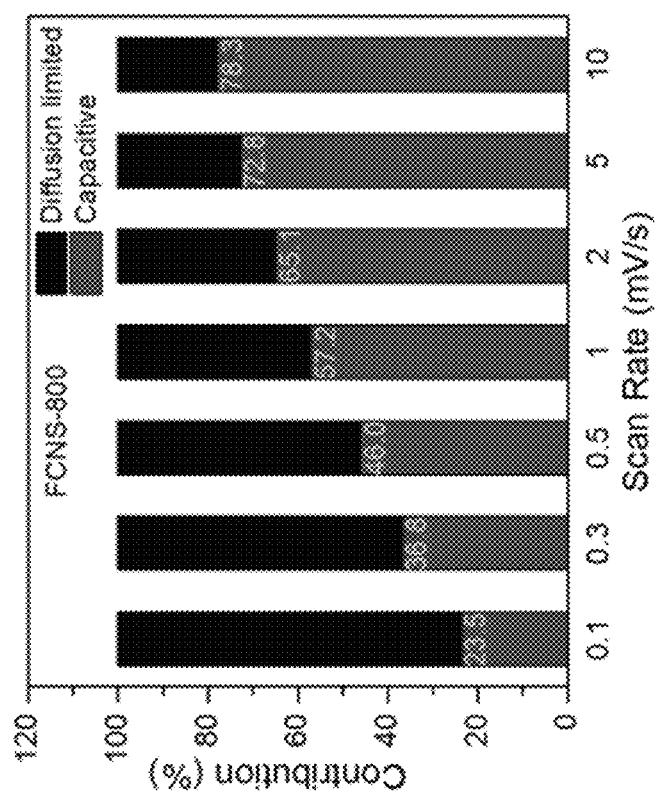
FIGS. 6A through 6D include pseudocapacitive and diffusion limited capacity contribution of the FCNS-800 electrode at a scan rate of 1 mV/s (FIG. 6A), pseudocapacitive and diffusion limited capacity contribution of the FCNS-800 electrode at different scan rates (FIG. 6B), galvanostatic cycling stability and coulombic efficiency of the FCNS-800 at a current density of 1 A/g (FIG. 6C), and a Nyquist plot of the FCNS-800 and carbon particles (FIG. 6D).
Figure 6A:
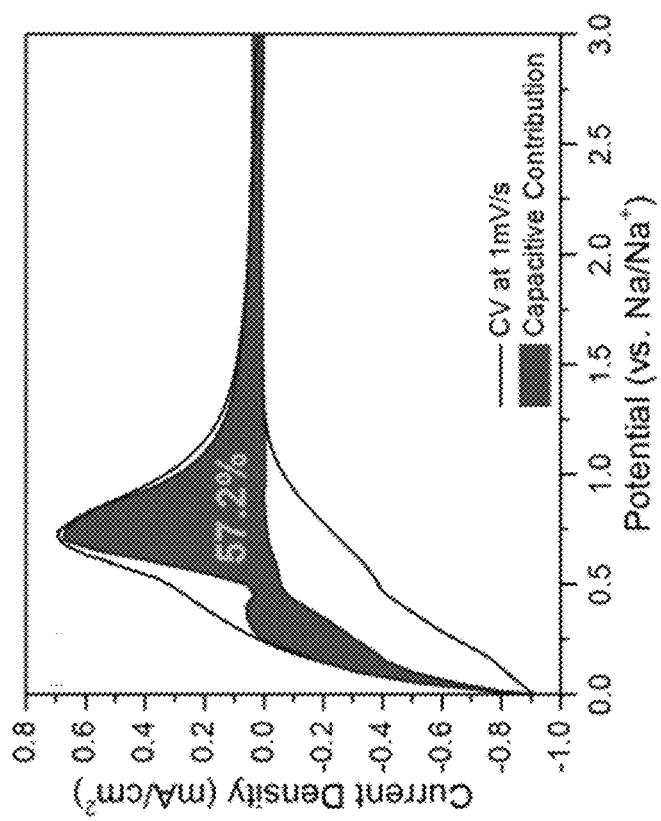

An ideal diffusion controlled process corresponded to b=0.5, while b=1 for nondiffusion-controlled surface redox processes. A potential dependence of an Na-ion storage mechanism is evident from the anodic and anodic b-values of FCNS-800 at different voltage ranges (FIG. 5F). Initial stages of the sodiation appeared to be diffusion limited (b of about 0.5) in the potential range of 1.2 to 0.65 V. However, the process became pseudocapacitive (b is about 0.5) up to 0.1 V followed by a less pseudocapacitive behavior in the potential range of 0.1 to 0 V. These three distinct Na-ion storage processes can be related to the Na-ion storage in micropores/defects, surface functional groups and disordered graphitic layers respectively. Na-ion intercalation into disordered graphitic layers also appeared to be partially pseudocapacitive (b=0.55 to 6.62) due to the ultrathin (about 15 nm) nature of the carbon nanosheets. Anodic b-values appeared to be higher than the corresponding cathodic values, representing an increased pseudocapacitive behavior. This was concluded to be due to the carbon interlayer expansion resulting from Na-ion intercalation. Lower b-values in the potential range of 0.2 to 0.6 represented Na-deintercalation from disordered graphitic layers, whereas the higher b-value regions in the potential range of 0 to 0.2 and 0.6 to 1.2 corresponded to desodiation from micropores/defects and surface functional groups, respectively. At a scan rate of 1 mV/s, the FCNS-800 electrode exhibited 57.2% of pseudocapacitive Na-ion storage (FIG. 6A). The pseudocapacitive Na-ion storage contribution increased on increasing the scan rate (FIG. 6B) due to the dominant capacitive process at fast charge/discharge rates. This was in line with the sloping voltage profiles of the FCNS-800 electrode at higher charge-discharge rates, where the capacity contribution resulted from diffusion independent pseudocapacitive process.

Figure 6D:
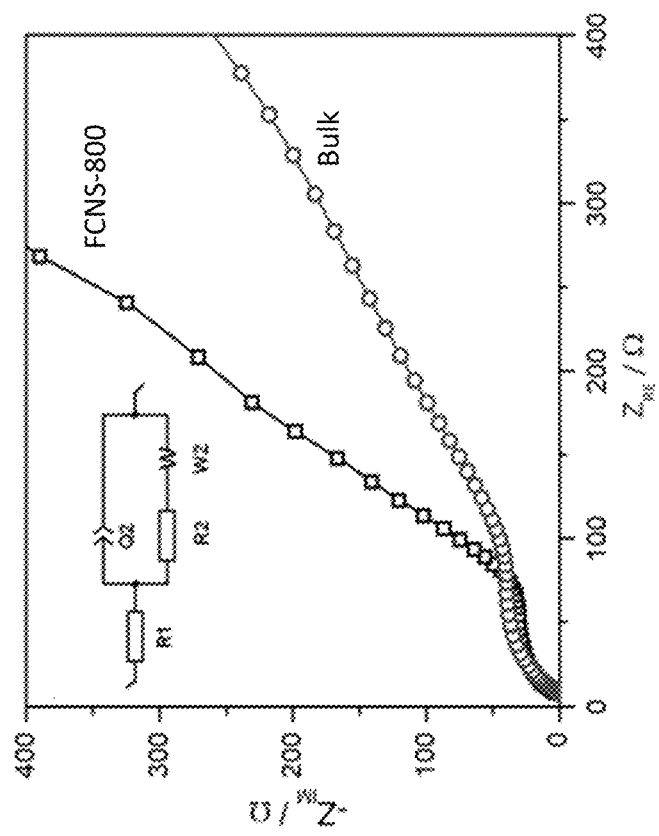
Figure 6C:
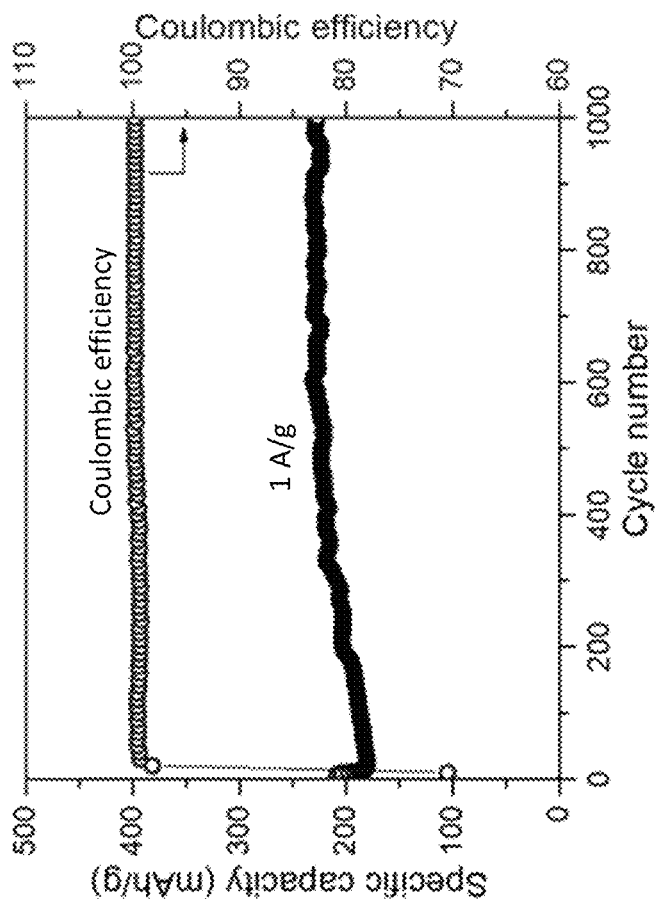

While long-term cycling stability is equally important to rate performance for practical battery operation, the galvanostatic-cycling stability of FCNS-800 was tested at a high current density of 1 A/g (FIG. 6C). No capacity fading was identified, and this sample retained a specific capacity of 210 mAh/g (110% of the initial specific capacity) after 1000 galvanostatic cycles. Such an unusual capacity gain on prolonged cycling was attributed to the increased disorderness of the carbon nanosheets resulting from Na-ion intercalation. Outstanding cycling stability and coulombic efficiency (about 100%) observed in this case was superior to that reported for carbon-based electrodes. Electrochemical impedance spectroscopic (EIS) measurements were performed to investigate the Na-ion diffusion kinetics into FCNS electrodes. Nyquist plots of both FCNS and carbon particles (FIG. 6D) consisted of a semicircle at high frequency and a sloping straight line at low frequency that corresponded to charge-transfer resistance ($R_{ct}$) and solid-state diffusion ($Z_w$) of Na-ions, respectively. Smaller charge transfer and solid-state diffusion resistance of FCNS-800 in contrast to amorphous carbon particles containing surface functional groups is clearly visible in the EIS spectra. Calculated Na-ion diffusion coefficients for carbon particles and FCNS-800 were $4.6 \times 10^{-16}$ and $2.1 \times 10^{-14}$, respectively. By correlating the EIS spectra with rate performance and specific capacities of these samples, it was concluded that the ultrathin 2D morphology of the carbon nanosheets was responsible for the reduced charge-transfer/solid-state diffusion resistance and enhanced Na-ion storage performance of the FCNS electrodes. This was also in agreement with the poor Na-ion storage performance of carbon particles prepared without using an NaCl template.

Figure 7A:
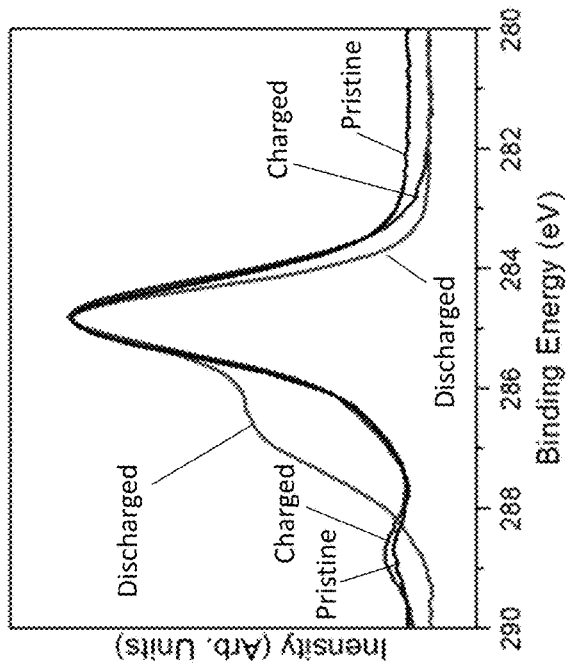
FIGS. 7A and 7B are, respectively, ex situ Raman and C is high-resolution XPS spectra of pristine, discharged, and charged FCNS-800 electrodes.
Figure 7B:
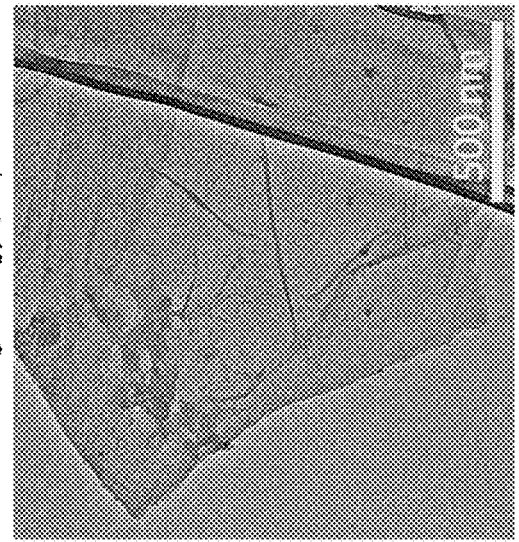

Surface chemical analysis of the FCNS-800 electrode at different states of sodiation was performed to further investigate the Na-ion storage mechanism and origin of pseudocapacitance. Raman spectra of the FCNS-800 electrode sodiated and desodiated at a current density of 20 mA/g demonstrated an increased D/G ratio of 1.0 compared to 0.915 for the pristine electrode (FIG. 7A). This clearly designated Na-ion intercalation into the disordered graphene layers as one of the charge storage mechanisms. Such an increased disorderness for the sodiated and desodiated electrodes was concluded to be due to the increased size of Na-ions. However, the D/G ratio of the FCNS-800 electrode cycled at 1A/g remained constant at different states of charge, signifying the lack of Na-ion intercalation at higher charge-discharge rates. This observation was in agreement with the increased pseudocapacitive Na-ion storage and the disappearance of a lower voltage plateau at higher current densities. High-resolution C1s XPS spectra of pristine, discharged and charged FCNS-800 electrodes were collected to further investigate the pseudocapacitive Na-ion storage mechanism (FIG. 7B). Intensity of peaks corresponding to O—C=O/C=O groups decreased after discharge, and an additional signal characteristic of a carbon-oxygen single bond (C—O) appeared in the BE range of 285.5 to 287.5 eV. C1s high resolution XPS was restored to the original state in the case of the charged FCNS-800 electrode. These findings correlated very well with the reversible Na-ion storage involving carbon-oxygen double bonds (—C=O+ $Na^+ + e^- \cdots$ —C—O—Na). Other surface functional groups with only single bonds (C—O, C—H, etc.) and double layer Na-ion storage may also contribute very little to the specific capacity. This mechanism was also consistent with the surface chemical quantification, in which the Na-signal increased considerably for the discharged FCNS-800 electrode and disappeared on charging. Quantitative analyses of the pristine, discharged and charged FCNS-800 electrode are summarized in FIG. 8. The presence of Cl in the discharged and charged sample resulted from $NaClO_4$ decomposition and a consequent SEI formation. Electrolyte decomposition products also contributed toward the increased oxygen content in the discharged and charged electrodes.

Figure 7C:
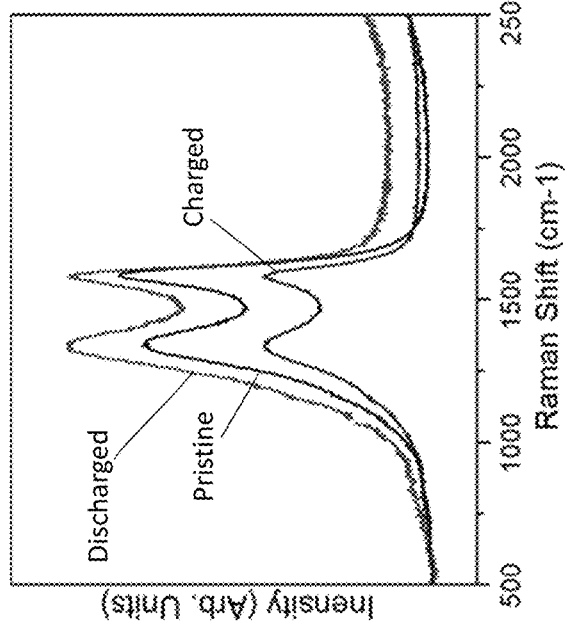
FIGS. 7C and 7D are TEM images of a cycled FCNS-800 electrode.
Figure 7D:
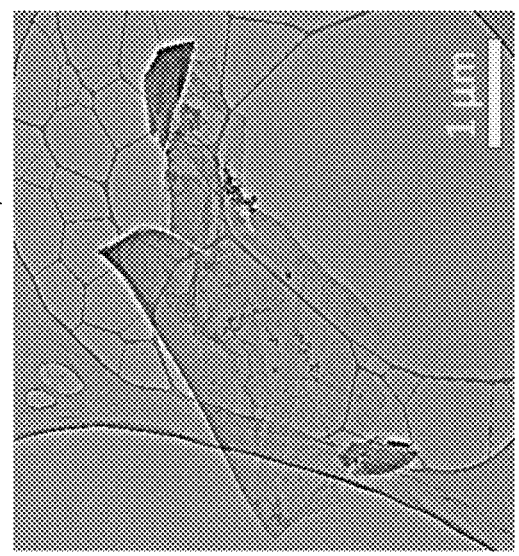

From the foregoing, it was concluded that oxygen-containing functional groups were primarily responsible for the pseudocapacitive surface Na-ion storage of the evaluated functionalized carbon nanosheets. This was also consistent with the reduced Na-ion storage performance of the carbon nanosheets without surface functional groups. Post-cycling TEM images (FIGS. 7C and 7D) demonstrated excellent structural stability of the FCNS-800 electrodes after 1000 galvanostatic cycles at a current density of 1 A/g. This was ascribed to the enhanced pseudocapacitive surface Na-ion storage at higher charge discharge rates. Such diffusion independent Na-ion storage was promising for achieving excellent cycling stability and rate performances due to the lack of microstructural changes. Another important observation was the lack of excess SEI on FCNS-800 samples, which is beneficial for maintaining superior Na-ion diffusion kinetics. This was ascribed to the ultra-smooth surface of the functionalized carbon nanosheets that facilitated uniform current distribution, which avoided hotspot formation and excessive electrolyte decomposition. EDX mapping of the cycled FCNS-800 exhibited a homogeneous distribution of C, O, Na, and Cl confirming a uniform SEI formation.

Superior Na-ion storage electrochemical performance of the functionalized carbon nanosheet electrodes was attributed to a unique combination of ultrathin 2D morphology, mesoporosity, surface functional groups, and disordered microstructure. In the case of functionalized carbon nanosheet electrodes, 2D morphology, ultrathin nature, and mesoporosity facilitate superior contact with the electrolyte solution and facilitate superior interfacial Na-ion diffusion kinetics. Amorphous microstructure and larger interlayer spacing causes improved Na-ion intercalation into disordered graphene layers. Both Na-ion intercalation and pseudocapacitive surface storage contribute toward the overall specific capacity at slower charge-discharge rates, whereas surface functional groups facilitate diffusion independent pseudocapacitive type surface Na-ion storage that enables stable charge-discharge cycles at higher current densities without undergoing structural changes. In conclusion, synergy between two distinct storage mechanisms and microstructural/morphology advantages of a functionalized carbon nanosheet make it an excellent anode material for fast charging Na-ion batteries with long cycle-life. The synthetic method described here is scalable and inexpensive and can also be extended to 2D metal-carbon, metal oxide-carbon hybrids and anion/cation doped carbon nanosheets. Functional group-induced surface Na-ion storage can also be implemented for boosting the electrochemical performance of carbonaceous and metal oxide Na-ion battery anodes.

As evidenced by the above-noted experimental investigations, superior pseudocapacitance assisted fast reversible Na-ion storage on ultrathin in situ functionalized carbon nanosheets was demonstrated. These 2D electrodes demonstrated excellent specific capacities and rate performances. Coulombic efficiency and long-term galvanostatic cycling stabilities are also exceptional. Electrode microstructures presented herein possessed multiple advantages to enhance Na-ion storage electrochemical performance. The ultrathin and amorphous nature of the nanosheets enabled enhanced Na-ion diffusion into the disordered graphitic layers. Disorderness of the nanosheets increased with increasing processing temperatures, and the thicknesses of the nanosheets increased with increasing glucose to NaCl ratios. On this basis, desirable processing temperatures are believed to be above 400° C. and at least up to about 800° C., and desirable NaCl:glucose ratios are believed to be in a range of about 2:1 to about 100:1 by weight.

Mesoporosity facilitated superior contact with the electrolyte solution, resulting in improved interfacial kinetics. Moreover, oxygen-containing surface functional groups provided additional sites for pseudocapacitive-type surface Na-ion storage. Spectroscopic, microscopic and electrochemical investigations confirmed a synergetic effect of Na-ion intercalation and surface storage mechanisms. The high-performance carbon nanosheet electrodes described herein were concluded to be potential anode materials for next generation ultralong life and fast charging Na-ion batteries. The strategy of functional group and morphology induced pseudocapacitive Na-ion storage can also be extended for the designing of numerous high-performance Na-ion battery electrodes.

While the invention has been described in terms of specific or particular embodiments and investigations, it should be apparent that alternatives could be adopted by one skilled in the art. For example, the nanosheets could differ in appearance and construction from the embodiments described herein and represented in the drawings, nanosheets produced by the methods disclosed herein could be used for applications other than as electrode materials for Na-ion batteries, and process parameters such as temperatures and durations could be modified. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A method of producing functionalized carbon nanosheets, the method comprising:
preparing a solution containing dissolved glucose;
mixing a quantity of NaCl crystals with the solution to form a mixture;
drying the mixture to form a gel comprising NaCl crystals each having a layer of glucose thereon;
heating the gel in an inert atmosphere to a processing temperature and for a duration sufficient to cause carbonization of the glucose and in situ functionalization with oxygen-containing functional groups; and
removing the NaCl crystals to yield the functionalized carbon nanosheets.

2. The method of claim 1, wherein the mixture contains NaCl and glucose in a ratio of 2:1 to 100:1 by weight.

3. The method of claim 1, wherein the processing temperature is above 400° C.

4. The method of claim 1, wherein the processing temperature is at least about 800° C.

5. The method of claim 1, wherein the NaCl is removed with deionized water.

6. The method of claim 1, wherein the oxygen-containing functional groups comprise at least O—C=O and C=O groups.

7. The method of claim 1, wherein the functionalized carbon nanosheets are two-dimensional nanosheets.

8. The method of claim 1, wherein the functionalized carbon nanosheets contain mesoporosity.

9. The method of claim 1, wherein the functionalized carbon nanosheets have amorphous microstructures.

10. The method of claim 1, wherein the functionalized carbon nanosheets consist of carbon and the oxygen-containing functional groups.

11. An electrochemical energy storage cell comprising an electrode formed from the functionalized carbon nanosheets of claim 1.

12. The electrochemical energy storage cell of claim 11, wherein the cell is part of a sodium-ion battery.

13. An electrochemical energy storage cell comprising an electrode formed from the functionalized carbon nanosheets of claim 10.

14. The electrochemical energy storage cell of claim 13, wherein the cell is part of a sodium-ion battery.

* * * * *